Figures 1, 4:
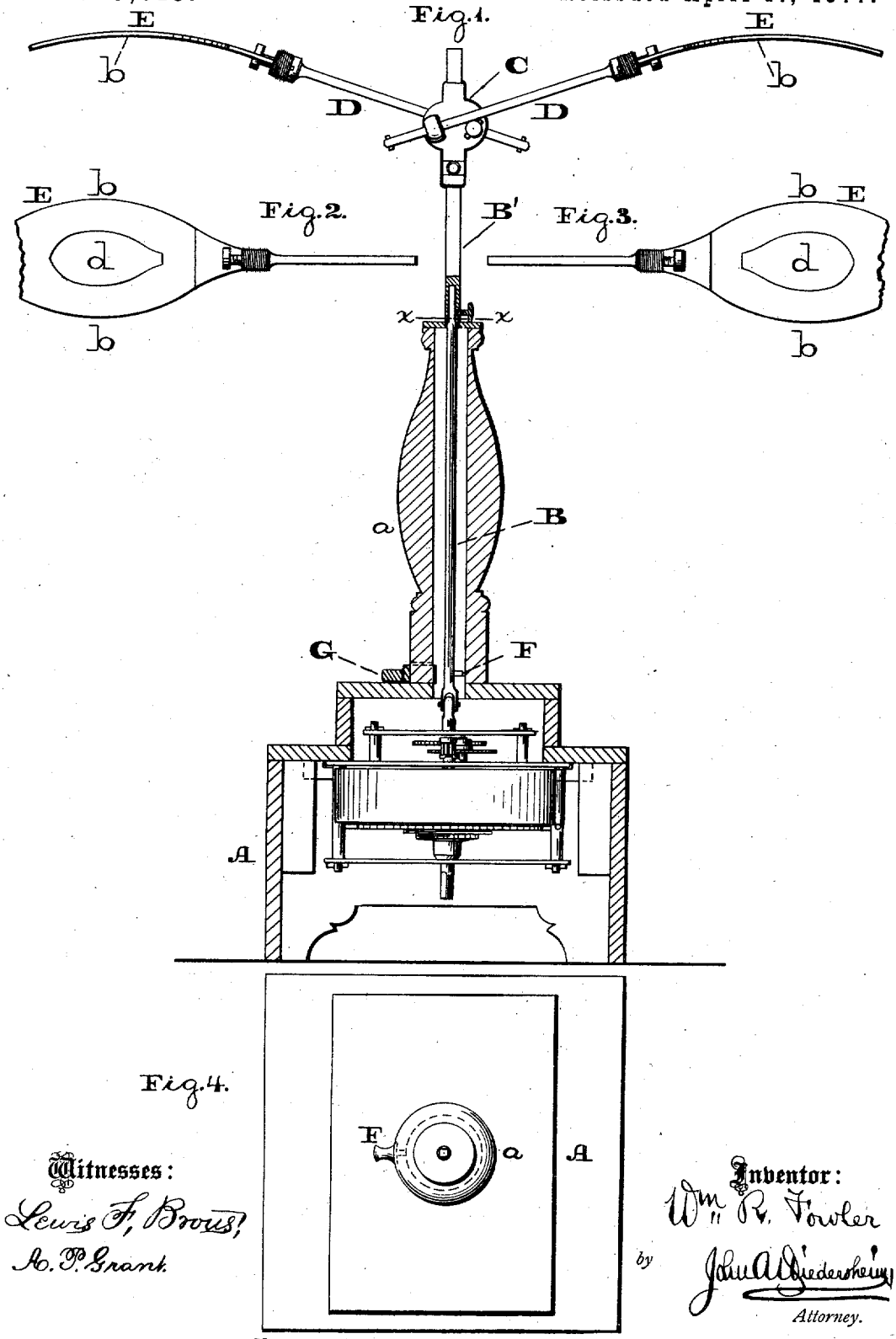

W. R. FOWLER.

Assignor to S. W. Lambeth and W. R. Lafourcade.

FLY-FAN.

No. 7,613. Reissued April 17, 1877.

Witnesses:

Lewis F. Brous,

A. P. Grank.

Inventor:

Wm. R. Fowler by John A. Wiedersheim

Attorney.

N. PETERS, PHOTO-LITHOGRAPHER, WASHINGTON, D. C.

UNITED STATES PATENT OFFICE.

WILLIAM R. FOWLER, OF BALTIMORE, MARYLAND, ASSIGNOR TO SAMUEL W. LAMBETH, OF PHILADELPHIA, PENNSYLVANIA, AND WILLIAM R. LAFOURCADE, OF BEVERLY, NEW JERSEY.

IMPROVEMENT IN FLY-FANS.

Specification forming part of Letters Patent No. 40,746, dated December 1, 1863; reissue No. 7,613, dated April 17, 1877; application filed January 12, 1877.

*To all whom it may concern:*

Be it known that I, WILLIAM R. FOWLER, formerly of Anne Arundel county, and at present of the city and county of Baltimore and State of Maryland, have invented a new and useful Improvement in Fly-Fans; and I do hereby declare the following to be a clear and exact description of the nature thereof, sufficient to enable others skilled in the art to which my invention appertains to fully understand, make, and use the same, reference being had to the accompanying drawings, making a part of this specification, in which—

Figure 1 is a central vertical section and partial side elevation. Figs. 2 and 3 are plan views of the fans. Fig. 4 is a top view below the line *x x*, Fig. 1.

Similar letters of reference indicate corresponding parts in the several figures.

My invention consists in presenting to the course of rotation the edges of mechanically-operated fans arranged to rotate horizontally in contradistinction to their broad sides, whereby the fans rotate with the least possible resistance, and the broad sides produce shadows that readily frighten and drive off flies and insects in proximity to the apparatus.

It also consists of a sleeve adjustably fitted on the shaft so as to be raised and lowered thereto.

It further consists of means for conveniently arresting the rotating of the shaft.

Referring to the drawings, A represents a stand or case, within which is located a suitable clock-work, or movement for imparting rotation to a shaft, B, which extends vertically and projects through the standard *a* of the stand A. To the shaft B there is removably connected a shaft, B′, having a socket or tubular portion which fits on said shaft B, so that the two parts B B′ will have a common rotation. C represents a sleeve which is fitted on the shaft B′, and has a sliding motion thereon so as to be raised or lowered. To said sleeve are connected arms D, which project in opposite directions, and they are raised and lowered with the sleeve C. E represents fans, which are arranged to rotate horizontally and connected to the arms D, and they consist of flat blades, which may be made of thin material, dark colors being preferred, and they have their edges or narrow sides *b* presented to the course of rotation of the fans, in contradistinction to the broad sides or flat faces *d*.

The case A will be placed on a table, or elsewhere, in proximity to the place infested by flies or other insects.

When the clock-work is, or has been, properly wound, the shaft B B′ will receive rotation, and with it the arms D and fans E. As the edges *b* of the fans advance, they present the least possible resistance to the rotation of the fans. The broad sides or flat faces *d* appear overhead and form shadows that quickly frighten and drive off the insects.

The height of the fans may be readily regulated by properly adjusting the sleeve C on the shaft B′.

In order to arrest the rotation of the shaft I secure to the shaft a projecting pin, F, which is adapted to be engaged by a stop, G, movably fitted to the standard *a* of the stand, so that by forcing in the stop it will engage with the pin F and control the shaft. By withdrawing the stop the pin F will be disengaged, and the shaft is permitted to rotate.

When the device is to be transported or packed the portion B′ of the shaft will be removed from the portion B, thus making a smaller compass of the device.

Having thus described my invention, what I claim as new, and desire to secure by Letters Patent, is—

1. Fly-fans arranged to rotate horizontally, and having their edges or narrow sides presented to the course of rotation, substantially as set forth.

2. The sleeve C adjustably fitted to the rotating shaft of the fly-fan arms, substantially as and for the purpose set forth.

3. The combination, with the rotary shaft of a fly-fan, of the projecting-pin F and the movable stop G, substantially as and for the purpose set forth.

4. The stand A with clock-work, the sectional shaft B B′, adjustable sleeve C, and arms D, combined and operating substantially as and for the purpose set forth.

WILLIAM R. FOWLER.

Witnesses:

O. G. DEAVER,

WM. D. ELDRIDGE.